US010097884B2

(12) United States Patent
Miao

(10) Patent No.: US 10,097,884 B2
(45) Date of Patent: Oct. 9, 2018

(54) MEDIA PLAYBACK METHOD, CLIENT AND SYSTEM

(71) Applicant: TENCENT TECHNOLOGY (SHENZHEN) COMPANY LIMITED, Shenzhen (CN)

(72) Inventor: Kunjie Miao, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/176,314

(22) Filed: Jun. 8, 2016

(65) Prior Publication Data
US 2016/0286264 A1 Sep. 29, 2016

Related U.S. Application Data

(63) Continuation of application No. PCT/CN2015/071170, filed on Jan. 21, 2015.

(30) Foreign Application Priority Data

Jan. 22, 2014 (CN) .......................... 2014 1 0030510

(51) Int. Cl.
H04N 21/439 (2011.01)
H04N 21/81 (2011.01)
(Continued)

(52) U.S. Cl.
CPC ........ H04N 21/4394 (2013.01); H04H 60/58 (2013.01); H04L 67/42 (2013.01);
(Continued)

(58) Field of Classification Search
CPC ............. H04N 21/4394; H04N 21/439; H04N 21/8113
See application file for complete search history.

(56) References Cited

U.S. PATENT DOCUMENTS 6,507,727 B1 * 1/2003 Henrick ................. G06Q 30/06
348/E7.071
9,319,445 B2 * 4/2016 Garmark ................. H04L 65/60
(Continued)

FOREIGN PATENT DOCUMENTS

CN 101441667 A 5/2009
CN 101595492 A 12/2009
(Continued)

OTHER PUBLICATIONS

Office Action in CN Application No. 201410030510.3 dated Sep. 17, 2015, 7 pages, with concise statement of relevance.
(Continued)

Primary Examiner — Pinkal R Chokshi
(74) Attorney, Agent, or Firm — Morgan, Lewis & Bockius LLP

(57) ABSTRACT

A media playback method, client device and system are described. The method includes: acquiring, by a client device, audio information from a radio station, and extracting audio feature information from the audio information; sending the audio feature information to a server; receiving media information that is matched according to the audio feature information and returned by the server; downloading a corresponding media file from the server according to the media information at a current playback progress; and switching a current playback mode from the radio station to a media player, and playing the downloaded media file according to a playback progress of the radio station.

15 Claims, 6 Drawing Sheets

(51) Int. Cl.
*H04N 21/61* (2011.01)
*H04N 21/658* (2011.01)
*H04L 29/06* (2006.01)
*H04H 60/58* (2008.01)

(52) U.S. Cl.
CPC ....... *H04N 21/439* (2013.01); *H04N 21/6112* (2013.01); *H04N 21/6582* (2013.01); *H04N 21/8113* (2013.01)

(56) References Cited

U.S. PATENT DOCUMENTS

| | | | |
|---|---|---|---|
| 2005/0197724 A1 | 9/2005 | Neogi | |
| 2006/0156343 A1* | 7/2006 | Jordan | H04N 7/17318 725/50 |
| 2006/0290699 A1* | 12/2006 | Dimtrva | G06K 9/00268 345/473 |
| 2007/0060361 A1* | 3/2007 | Nguyen | G07F 17/32 463/42 |
| 2007/0124775 A1 | 5/2007 | DaCosta | |
| 2008/0151888 A1* | 6/2008 | Ahmed | H04N 21/475 370/390 |
| 2008/0268802 A1* | 10/2008 | Ricard | G10L 25/78 455/179.1 |
| 2008/0297669 A1* | 12/2008 | Zalewski | H04N 7/163 348/844 |
| 2009/0106847 A1* | 4/2009 | Krupman | G06F 21/10 726/26 |
| 2009/0185785 A1* | 7/2009 | Matsutani | H04H 60/27 386/297 |
| 2010/0291861 A1* | 11/2010 | Anzures | H04H 20/26 455/3.01 |
| 2011/0247042 A1* | 10/2011 | Mallinson | G06F 17/30026 725/86 |
| 2013/0338805 A1* | 12/2013 | Cheng | H04N 21/4305 700/94 |
| 2014/0215535 A1* | 7/2014 | Elliott | H04N 21/2387 725/81 |
| 2014/0223303 A1* | 8/2014 | Cox | H04L 65/60 715/716 |
| 2014/0280773 A1* | 9/2014 | Sharp | H04L 65/4084 709/219 |
| 2014/0336798 A1* | 11/2014 | Emerson, III | G10L 19/018 700/94 |
| 2015/0012660 A1* | 1/2015 | Kuulusa | H04L 65/4084 709/231 |
| 2015/0286464 A1 | 10/2015 | Yi et al. | |
| 2016/0073141 A1* | 3/2016 | Brand | H04N 5/4401 725/32 |
| 2016/0142749 A1* | 5/2016 | Francis | H04H 20/18 725/37 |
| 2016/0286264 A1 | 9/2016 | Miao | |

FOREIGN PATENT DOCUMENTS

| | | |
|---|---|---|
| CN | 101741975 A | 6/2010 |
| CN | 102118203 A | 7/2011 |
| CN | 102236685 A | 11/2011 |
| CN | 102932081 A | 2/2013 |
| CN | 103021440 A | 4/2013 |
| CN | 103384176 A | 11/2013 |
| CN | 103455513 A | 12/2013 |
| CN | 104092654 A | 10/2014 |

OTHER PUBLICATIONS

Search Report in International Application No. PCT/CN2015/071170 dated Apr. 28, 2015, 3 pages.
International Preliminary Report on Patentability and Written Opinion in International Application No. PCT/CN2015/071170 dated Jul. 26, 2016, 6 pages.

\* cited by examiner

MEDIA PLAYBACK METHOD, CLIENT AND SYSTEM

CROSS-REFERENCE TO RELATED APPLICATIONS

This application is a continuation of International Application No. PCT/CN2015/071170, filed on Jan. 21, 2015. This application claims the benefit and priority of Chinese Patent Application No. 201410030510.3, filed Jan. 22, 2014. The entire disclosures of each of the above applications are incorporated herein by reference.

FIELD

The present disclosure relates to the field of media playback technologies, and in particular, to a media playback method, client and system.

BACKGROUND

A technology of identifying music by listening to a song is a technology in which after collecting a recording, a local client extracts an audio fingerprint of the recording, uploads the audio fingerprint to a server, then matches the audio fingerprint with data of the server by means of audio fingerprint matching, and returns a query result. The audio fingerprint can represent features, including tone, loudness, timbre and the like, of a song, and the information may be obtained by means of reporting of a service client of music playback application software.

Currently, the solution generally used to implement music playback by using the technology of identifying music by listening to a song is as follows: when a user listens to a song and records an audio file, related audio information is collected by using a service client program, the related audio information is reported to a data analysis server, and after obtaining the audio information by means of matching, the data analysis server provides downloading and playing services to the user.

SUMMARY

An embodiment of the present disclosure provides a media playback method, including:

acquiring, by a client device, audio information from a radio station, and extracting audio feature information from the audio information;

sending the audio feature information to a server;

receiving media information that is matched according to the audio feature information and returned by the server;

downloading a corresponding media file from the server according to the media information at a current playback progress; and switching a playback mode of the client device from the radio station to a media player, and playing the media file according to a playback progress of the radio station.

An embodiment of the present disclosure further provides a media playback client device, including:

an acquiring module, configured to acquire audio information from a radio station, and extract audio feature information from the audio information;

a sending module, configured to send the audio feature information to a server;

a receiving module, configured to receive media information that is matched according to the audio feature information and returned by the server;

a downloading module, configured to download a corresponding media file from the server according to the media information at a current playback progress; and a playing module, configured to switch a current playback mode from the radio station to a media player, and play the downloaded media file according to a playback progress of the radio station.

An embodiment of the present disclosure further provides a non-transitory machine readable storage medium, including a set of instructions, the set of instructions to direct at least one processor to perform the acts of:

acquiring, by a client device, audio information from a radio station, and extracting audio feature information from the audio information;

sending the audio feature information to a server;

receiving media information that is matched according to the audio feature information and returned by the server;

downloading a corresponding media file from the server according to the media information at a current playback progress; and switching a playback mode of the client device from the radio station to a media player, and playing the media file according to a playback progress of the radio station.

In the media playback method, client and non-transitory machine readable storage medium provided by the embodiments of the present disclosure, when listening to an audio file such as music played by a radio station, a user may match a corresponding audio file by using a server, and a media player of a client automatically downloads the corresponding audio file to replace the audio file played by the radio station, and therefore audio channels of the user can be expanded, and the media playback efficiency and effect can be improved; in addition, a media playback progress and playback stop can also be intelligently regulated, and the operation is simple and convenient.

BRIEF DESCRIPTION OF THE DRAWINGS

In order to illustrate technical solutions according to embodiments of the present disclosure, the drawings to be used in the descriptions of the embodiments of the disclosure will be described briefly hereinafter. The drawings described hereinafter include only some embodiments related to the present disclosure. Other drawings may be determined by those skilled in the art based on those drawings without any creative effort.

DESCRIPTION OF EMBODIMENTS

It should be understood that, specific embodiments described herein are merely used to explain the present disclosure, but are not used to limit the present disclosure.

Figure 1:
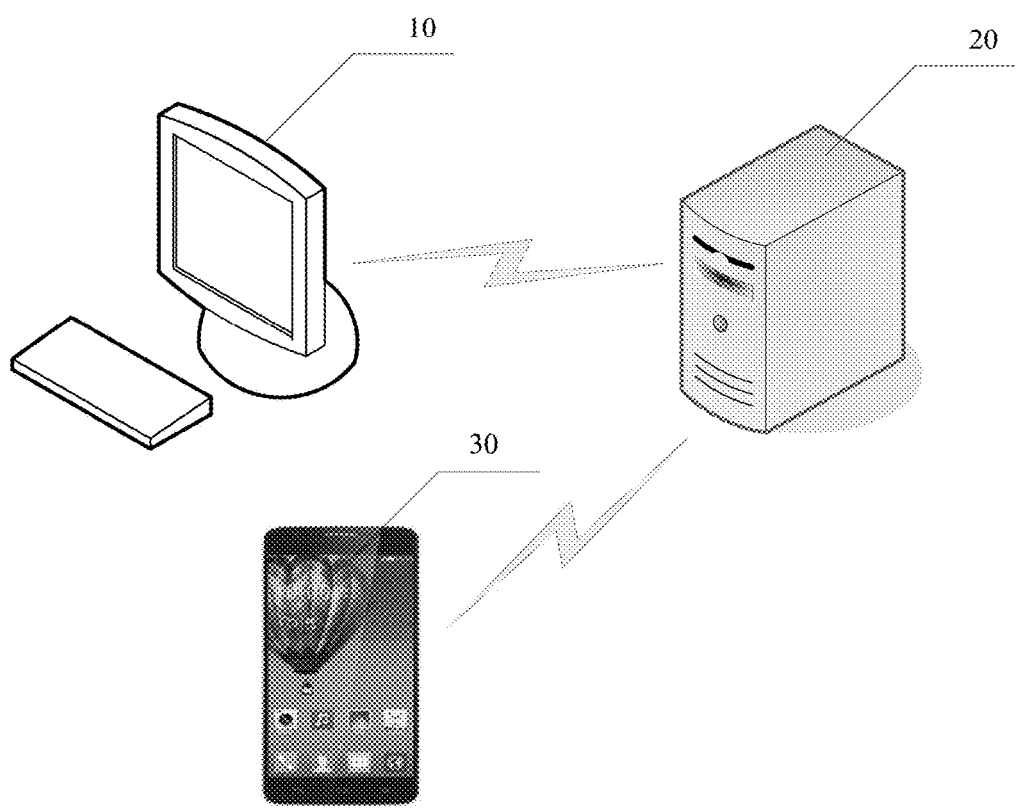
FIG. 1 is a schematic diagram of an involved hardware running environment according to an embodiment of the present disclosure.

As shown in FIG. 1, FIG. 1 is an architectural diagram of a hardware environment involved in a method according to an embodiment of the present disclosure. A hardware running environment involved in the method of this embodiment of the present disclosure includes a client and a network server 20, where the client may be a terminal with online media playback and radio station playback functions, for example, a PC 10, a mobile terminal (such as a mobile phone) 30, or the like, and the server 20 saves a mass quantity of music feature information and music files, performs audio data analysis, and provides music files to the client. The client may communicate with the server 20 by using a wireless network or a wired network.

In the solution of this embodiment of the present disclosure, when playing a radio station online, a client acquires audio information played by the radio station, and extracts audio feature information from the audio information; and sends the audio feature information to the server 20; the server 20 matches corresponding media information in a local database according to the audio feature information, and returns the matched media information to the client; and the client downloads a corresponding media file from the server according to the media information at a current playback progress, switches a current playback mode from the radio station to a media player, and plays the downloaded media file according to a playback progress of the radio station.

Therefore, a mechanism for identifying music by listening to a song is used, respective advantages of a music radio station and an online media player are combined, audio resources of the music radio station are used, media channels of a user are expanded, and a terminal media player automatically downloads a corresponding media file to replace that played by the radio station, to improve the media playback effect and efficiency, and provide better media playback services to the user.

Specifically, based on the hardware architecture shown in FIG. 1, a media playback method in the following embodiment is provided.

Figure 2:
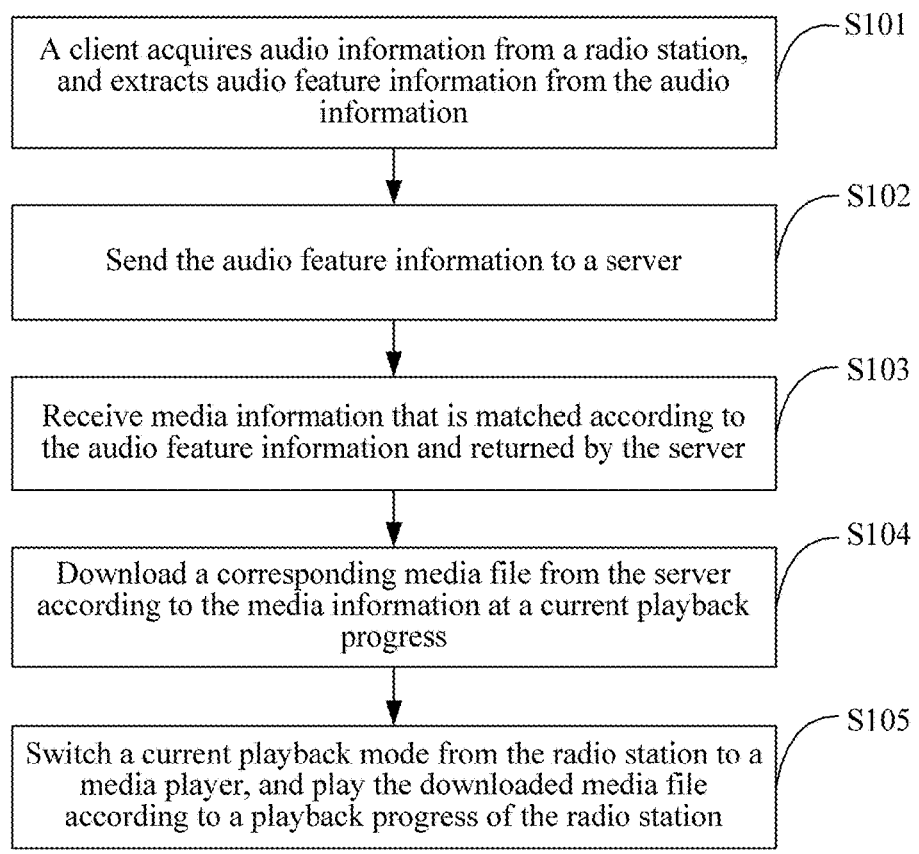
FIG. 2 is a schematic flowchart of a first embodiment of a media playback method according to the present disclosure.

As shown in FIG. 2, a first embodiment of the present disclosure provides a media playback method, including the following steps:

Step S101: A client acquires audio information from a radio station, and extracts audio feature information from the audio information.

Step S102: Send the audio feature information to a server.

In this embodiment of the present disclosure, a mechanism for identifying music by listening to a song is used, and respective advantages of a radio station and an online media player are combined, thereby providing better music playback services to a user.

The radio station refers to a traditional radio or a network radio that is on a mobile terminal or a computer platform and performs online playback by using a network. In this embodiment, a music radio station is used as an example for description, and more music resources of the music radio station are used to provide more song sources to the user for selection.

First, application software is opened on the client to play the music radio station online. Because information played by the music radio station is audio information, the application software of the client acquires the audio information of the music radio station in a manner of directly reading the audio information by using an audio waveform or a system background.

After the audio information of the music radio station is acquired, initial determining is performed first, and when the audio information conforms to some features of music, audio feature information is extracted and may be encoded in a certain format and uploaded to a side of the server by using a network, so as to acquire, from the server, a music file corresponding to the audio feature information, where the music file may be an audio-type song, and may also be an audio-video-type song, such as an MTV.

Step S103: Receive media information that is matched according to the audio feature information and returned by the server.

After receiving the audio feature information sent by the client, the server analyzes and decodes the audio feature information, then compares and matches song track feature information in a local music database with the decoded audio feature information, and when a certain song is hit, returns corresponding media information to the client, where the media information includes information about the hit song (such as a song name, and a downloading address) and the current play time of the song.

Step S104: Download a corresponding media file from the server according to the media information at a current playback progress.

After receiving the media information returned by the server, starting from a current playback progress of the radio station, the client downloads a high-quality song file from the server, where the song file may be an audio-type song, and may also be an audio-video-type song.

Step S105: Switch a current playback mode from the radio station to a media player, and play the downloaded media file according to a playback progress of the radio station.

When the song downloaded by the client meets current synchronous play of the radio station, the song is automatically switched from being played by the radio station to being played by a local media player of the client. During the play, the volume of the radio station is automatically controlled, for example, the sound of the radio station is silenced or lowered, and the downloaded song is played according to a progress of the radio station.

The media player may be various types of media playback application software, such as a QQ music player, installed on the client.

In addition, when song downloading proceeds, the user may also download lyrics from the server according to a requirement and synchronously display the lyrics.

In this embodiment, by using the foregoing solution, a mechanism for identifying music by listening to a song is used, and respective advantages of a music radio station and an online music player are combined, so that when listening to music of the radio station, a user identifies and matches corresponding music by using a player, and automatically downloads high-quality music to replace the music played by the radio station, which not only expands media channels of the user, but also implements lossless play of the music of the radio station by using the player, thereby providing better music playback services to the user.

Figure 3:
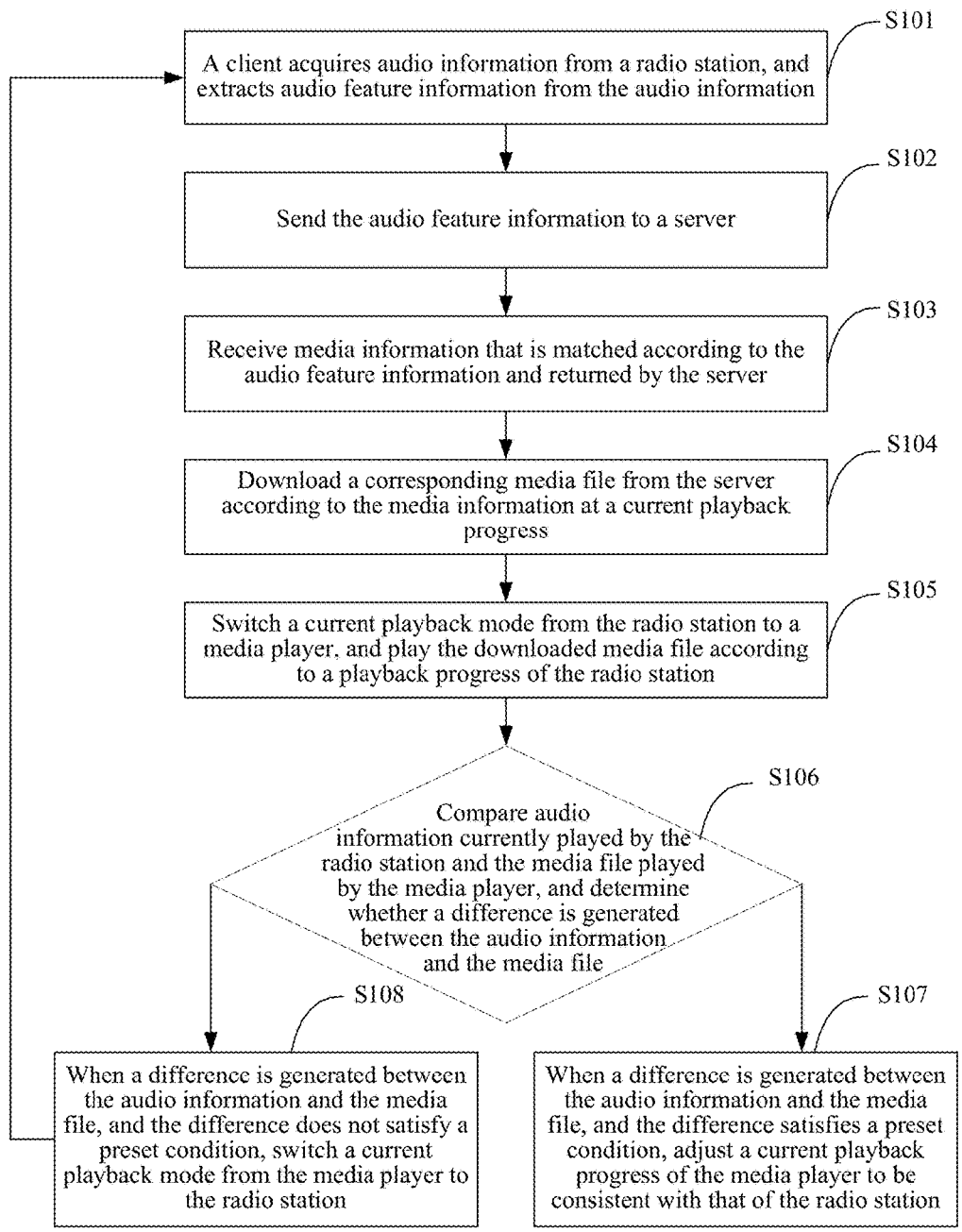
FIG. 3 is a schematic flowchart of a second embodiment of a media playback method according to the present disclosure.

As shown in FIG. 3, a second embodiment of the present disclosure provides a media playback method, and on the basis of the first embodiment shown in FIG. 2, after step S105 of switching a current playback mode from the radio station to a media player, and playing the downloaded media file according to a playback progress of the radio station, the method may further include the following steps:

Step S106: Compare audio information currently played by the radio station with the media file played by the media player, and determine whether a difference is generated between the audio information and the media file.

Step S107: When a difference is generated between the audio information and the media file, and the difference satisfies a preset condition, adjust a current playback progress of the media player to be consistent with that of the radio station.

Step S108: When a difference is generated between the audio information and the media file, and the difference does not satisfy a preset condition, switch a current playback mode from the media player to the radio station, and return to perform step S101.

The difference of this embodiment from the first embodiment shown in FIG. 2 lies in that this embodiment further includes a solution for adjusting a playback state of the media player.

Specifically, considering the program particularity of the music radio station, in a song downloading proceeding process, a host's voice or other non-music information may appear, and the client may continue to compare the audio information of the radio station with song information currently played by the media player, and when a tiny difference appears, adjust the playback progress to keep consistent. When a large difference appears, for example, when a host's voice appears or a song is changed to another, the song is automatically switched from being played by the media player to being played by the radio station. The process skips again to step S101 of acquiring audio information from the radio station, and extracting audio feature information from the audio information, to perform a next round of downloading and playing of the media file, and the cycle repeats itself.

Certainly, in a song downloading proceeding process, the user may also, according to a requirement or an actual situation, close the radio station or stop the function of using the player to replace the radio station to play a song.

In this embodiment, by using the foregoing solution, when playing a radio station online, a client acquires audio information played by the radio station, and extracts audio feature information from the audio information; and sends the audio feature information to the server; the server matches corresponding media information in a local database according to the audio feature information, and returns the matched media information to the client; and the client downloads a corresponding media file from the server according to the media information at a current playback progress, switches a current playback mode from the radio station to a media player, and plays the downloaded media file according to a playback progress of the radio station. Therefore, a mechanism for identifying music by listening to a song is used, respective advantages of a music radio station and an online media player are combined, audio resources of the music radio station are used, media channels of a user are expanded, and a terminal media player automatically downloads a corresponding media file to replace that played by the radio station, to improve the media playback effect and efficiency. In addition, a current media playback progress may also be adjusted in real time, thereby providing better media playback services to the user.

Compared with the prior art, in this embodiment, information about a radio station song listened to by the user can be analyzed and downloaded, and a high-quality song is played to the user, to bring relatively desirable user experience; the audio resources of the music radio station are used to expand media channels of the user, an intelligent playback effect can differentiate and analyze a song and a human voice, and adjust the playback progress, and the operation is simple and convenient.

Figure 4:
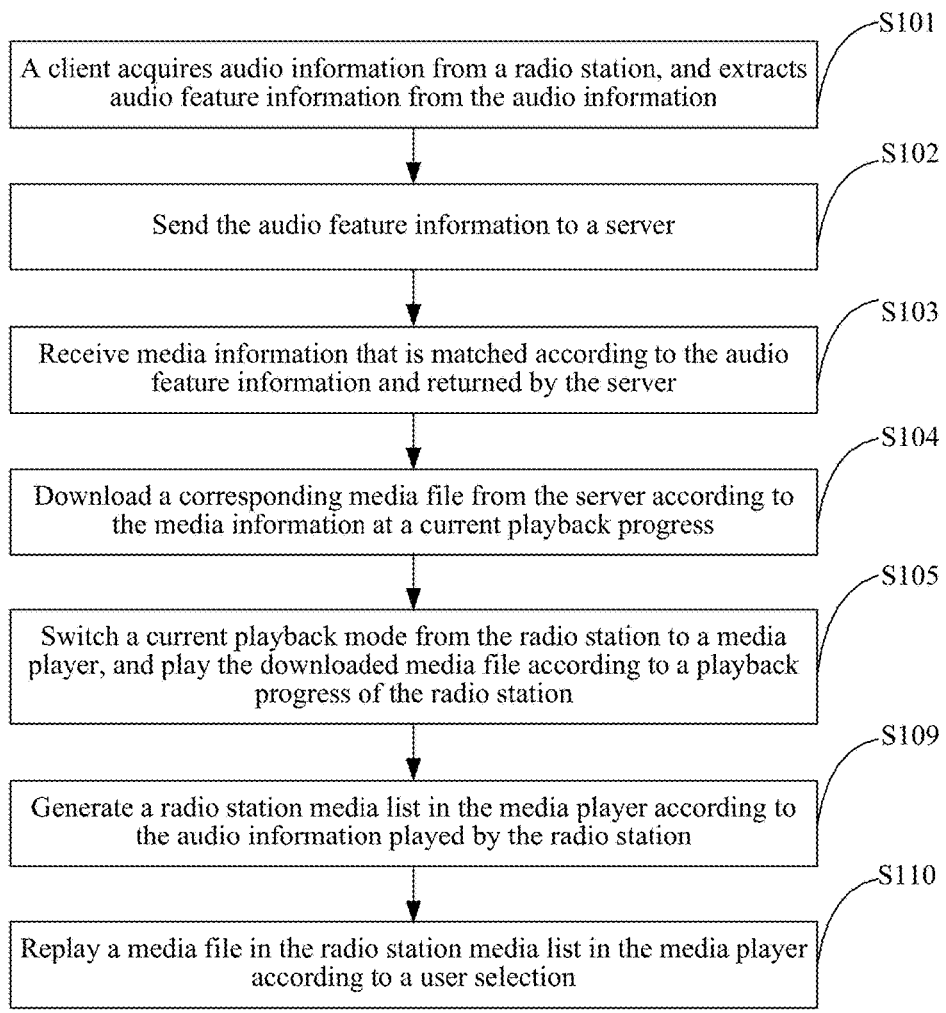
FIG. 4 is a schematic flowchart of a third embodiment of a media playback method according to the present disclosure.

As shown in FIG. 4, a third embodiment of the present disclosure provides a media playback method, and on the basis of the first embodiment shown in FIG. 2, after step S105 of switching a current playback mode from the radio station to a media player, and playing the downloaded media file according to a playback progress of the radio station, the method may further include the following steps:

Step S109: Generate a radio station media list in the media player according to the audio information played by the radio station.

Step S110: Replay a media file in the radio station media list in the media player according to a user selection.

The difference of this embodiment from the first embodiment shown in FIG. 2 lies in that this embodiment further includes a solution for collecting songs played by the radio station for subsequent replay, to expand channels of the user for listening to music.

Specifically, the media player of the client generates a radio station song list according to downloaded song information played by the radio station, saves the radio station song list into a radio station media list, and subsequently may select, according to a user requirement, a song in the radio station media list for replay, thereby avoiding waste of time for the user to search for a same song, and expanding channels of the user for listening to music.

Compared with the prior art, in this embodiment, information about a radio station song listened to by the user can be analyzed and downloaded, and a high-quality song is played to the user, to bring relatively desirable user experience, and the operation is simple and convenient; and advantages of the music radio station can be used to play high-quality music to the user, and a radio station program song list is automatically generated, which facilitates subsequent replay, thereby avoiding waste of time for the user to search for a same song, and expanding channels of the user for listening to music.

It should be noted that, this embodiment may further be implemented in combination with the second embodiment shown in FIG. 3.

Figure 5:
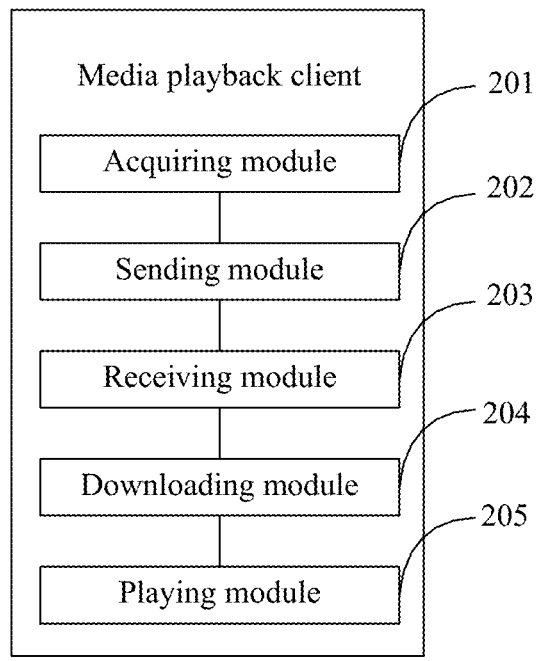
FIG. 5 is a schematic diagram of functional modules of a first embodiment of a media playback client according to the present disclosure.

As shown in FIG. 5, a first embodiment of the present disclosure provides a media playback client, including: an acquiring module 201, a sending module 202, a receiving module 203, a downloading module 204, and a playing module 205, where:

the acquiring module 201 is configured to acquire audio information from a radio station, and extract audio feature information from the audio information;

the sending module 202 is configured to send the audio feature information to a server;

the receiving module 203 is configured to receive media information that is matched according to the audio feature information and returned by the server;

the downloading module 204 is configured to download a corresponding media file from the server according to the media information at a current playback progress; and the playing module 205 is configured to switch a current playback mode from the radio station to a media player, and play the downloaded media file according to a playback progress of the radio station.

In this embodiment of the present disclosure, a mechanism for identifying music by listening to a song is used, and respective advantages of a radio station and an online media player are combined, thereby providing better music playback services to the user.

The radio station refers to a traditional radio or a network radio that is on a mobile terminal or a computer platform and performs online playback by using a network. In this embodiment, a music radio station is used as an example for description, and more music resources of the music radio station are used to provide more song sources to the user for selection.

First, application software is opened on the client to play the music radio station online. Because information played by the music radio station is audio information, the acquiring module 201 of the application software of the client acquires the audio information of the music radio station in a manner of directly reading the audio information by using an audio waveform or a system background.

After the audio information of the music radio station is acquired, initial determining is performed first, and when the audio information conforms to some features of music, audio feature information is extracted and may be encoded in a certain format, and the sending module 202 uploads the audio feature information to a side of the server by using a network, so as to acquire, from the server, a music file corresponding to the audio feature information, where the music file may be an audio-type song, and may also be an audio-video-type song, such as an MTV.

After receiving the audio feature information sent by the client, the server analyzes and decodes the audio feature information, then compares and matches song track feature information in a local music database with the decoded audio feature information, and when a certain song is hit, returns corresponding media information to the client, where the media information includes information about the hit song (such as a song name, and a downloading address) and the current play time of the song.

After the receiving module 203 of the client receives the media information returned by the server, starting from a current playback progress of the radio station, the downloading module 204 downloads a high-quality song file from the server, where the song file may be an audio-type song, and may also be an audio-video-type song.

When the song downloaded by the client meets current synchronous play of the radio station, the playing module 205 automatically switches the song from being played by the radio station to being played by a local media player of the client. During the play, the volume of the radio station is automatically controlled, for example, the sound of the radio station is silenced or lowered, and the downloaded song is played according to a progress of the radio station.

The media player may be various types of media playback application software, such as a QQ music player, installed on the client.

In addition, when song downloading proceeds, the user may also download lyrics from the server according to a requirement and synchronously display the lyrics.

In this embodiment, by using the foregoing solution, a mechanism for identifying music by listening to a song is used, and respective advantages of a music radio station and an online music player are combined, so that when listening to music of the radio station, a user identifies and matches corresponding music by using a player, and automatically downloads high-quality music to replace the music played by the radio station, which not only expands media channels of the user, but also implements lossless play of the music of the radio station by using the player, thereby providing better music playback services to the user.

Figure 6:
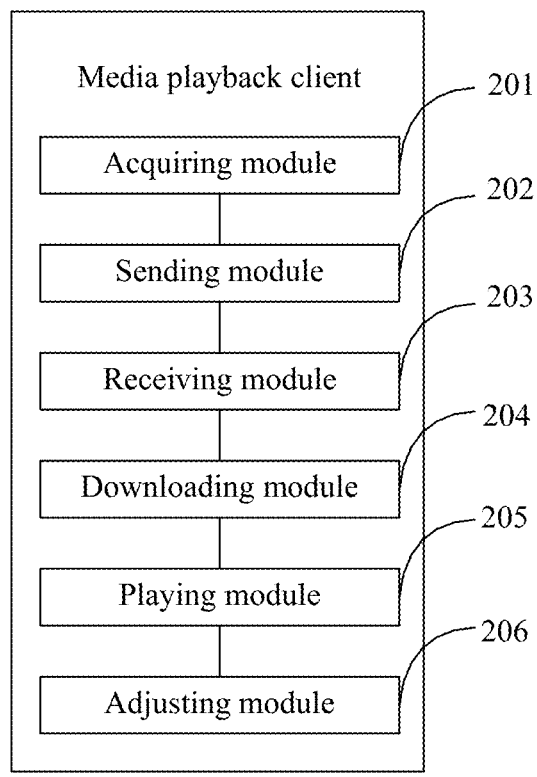
FIG. 6 is a schematic diagram of functional modules of a second embodiment of a media playback client according to the present disclosure.

As shown in FIG. 6, a second embodiment of the present disclosure provides a media playback client, and on the basis of the first embodiment shown in FIG. 5, the media playback client further includes:

an adjusting module 206, configured to compare audio information currently played by the radio station with the media file played by the media player, and determine whether a difference is generated between the audio information and the media file; and when a difference is generated between the audio information and the media file, and the difference satisfies a preset condition, adjust a current playback progress of the media player to be consistent with that of the radio station; or when a difference is generated between the audio information and the media file, and the difference does not satisfy a preset condition, switch a current playback mode from the media player to the radio station, and the acquiring module 201 acquires audio information from the radio station, and extracts audio feature information from the audio information.

The difference of this embodiment from the first embodiment shown in FIG. 5 lies in that this embodiment further includes a solution for adjusting a playback state of the media player.

Specifically, considering the program particularity of the music radio station, in a song downloading proceeding process, a host's voice or other non-music information may appear, and the client may continue to compare the audio information of the radio station with song information currently played by the media player, and when a tiny difference appears, adjust the playback progress to keep consistent. When a large difference appears, for example, when a host's voice appears or a song is changed to another, the song is automatically switched from being played by the media player to being played by the radio station. The process skips again to the acquiring, by the acquiring module 201, audio information from the radio station, and extracting audio feature information from the audio information, to perform a next round of downloading and playing of the media file, and the cycle repeats itself.

Certainly, in a song downloading proceeding process, the user may also, according to a requirement or an actual situation, close the radio station or stop the function of using the player to replace the radio station to play a song.

In this embodiment, by using the foregoing solution, when playing a radio station online, a client acquires audio information played by the radio station, and extracts audio feature information from the audio information; and sends the audio feature information to the server; the server matches corresponding media information in a local database according to the audio feature information, and returns the matched media information to the client; and the client downloads a corresponding media file from the server according to the media information at a current playback progress, switches a current playback mode from the radio station to a media player, and plays the downloaded media file according to a playback progress of the radio station. Therefore, a mechanism for identifying music by listening to a song is used, respective advantages of a music radio station and an online media player are combined, audio resources of the music radio station are used, media channels of a user are expanded, and a terminal media player automatically downloads a corresponding media file to replace that played by the radio station, to improve the media playback effect. In addition, a current media playback progress may also be adjusted in real time, thereby providing better media playback services to the user.

Compared with the prior art, in this embodiment, information about a radio station song listened to by the user can be analyzed and downloaded, and a high-quality song is played to the user, to bring relatively desirable user experience; the audio resources of the music radio station are used to expand media channels of the user, an intelligent playback effect can differentiate and analyze a song and a human voice, and adjust the playback progress, and the operation is simple and convenient.

Figure 7:
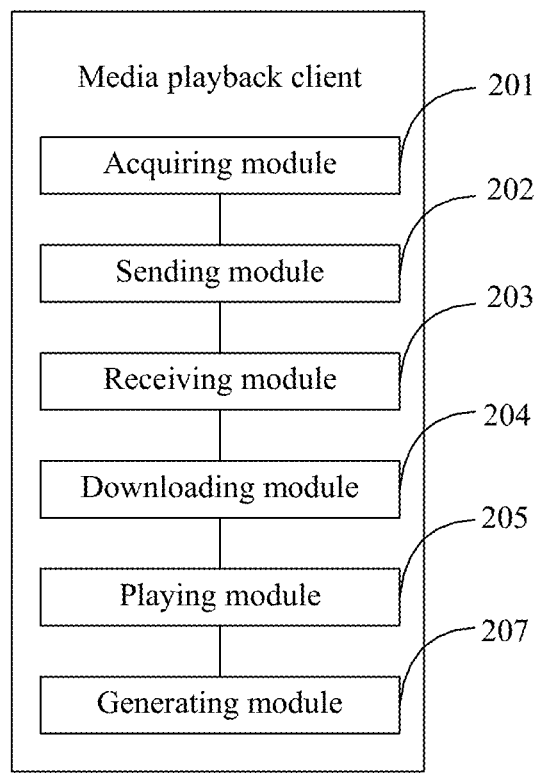
FIG. 7 is a schematic diagram of functional modules of a third embodiment of a media playback client according to the present disclosure.

As shown in FIG. 7, a third embodiment of the present disclosure provides a media playback client, and on the basis of the first embodiment shown in FIG. 5, the media playback client further includes:

a generating module 207, configured to generate a radio station media list in the media player according to the audio information played by the radio station, where the playing module 205 is further configured to replay a media file in the radio station media list in the media player according to a user selection.

The embodiment may further be implemented in combination with the second embodiment shown in FIG. 6.

The difference of this embodiment from the first embodiment shown in FIG. 5 lies in that this embodiment further includes a solution for collecting songs played by the radio station for subsequent replay, to expand channels of the user for listening to music.

Specifically, the media player of the client generates a radio station song list according to downloaded song information played by the radio station, saves the radio station song list into a radio station media list, and subsequently may select, according to a user requirement, a song in the radio station media list for replay, thereby avoiding waste of time for the user to search for a same song, and expanding channels of the user for listening to music.

Compared with the prior art, in this embodiment, information about a radio station song listened to by the user can be analyzed and downloaded, and a high-quality song is played to the user, to bring relatively desirable user experience, and the operation is simple and convenient; and advantages of the music radio station can be used to play high-quality music to the user, and a radio station program song list is automatically generated, which facilitates subsequent replay, thereby avoiding waste of time for the user to search for a same song, and expanding channels of the user for listening to music.

Figure 8:
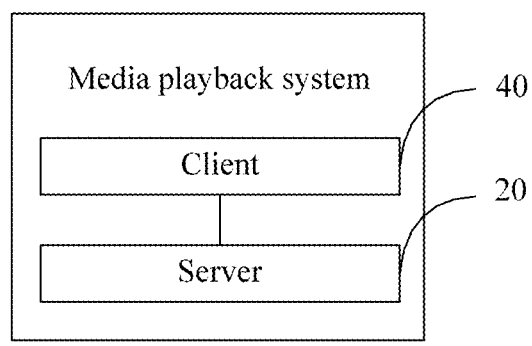
FIG. 8 is a schematic structural diagram of a preferred embodiment of a media playback system according to the present disclosure.

As shown in FIG. 8, a preferred embodiment of the present disclosure provides a media playback system, including: a client 40, and a server 20 in a communication connection to the client 40, and reference may be made to the hardware architecture in FIG. 1. The client 40 may be a terminal with online media playback and radio station playback functions, for example, a PC, a mobile terminal (such as, a mobile phone), or the like.

The client 40 may be the client according to the foregoing embodiment.

The server 20 is configured to receive audio feature information sent by the client 40, match corresponding media information in a local database according to the audio feature information, return the matched media information to the client 40, and push a corresponding media file to the client 40 according to a downloading request of the client 40.

Specifically, in this embodiment of the present disclosure, a mechanism for identifying music by listening to a song is used, and respective advantages of a radio station and an online media player are combined, thereby providing better music playback services to the user.

The radio station refers to a traditional radio or a network radio that is on a mobile terminal or a computer platform and performs online playback by using a network. In this embodiment, a music radio station is used as an example for description, and more music resources of the music radio station are used to provide more song sources to the user for selection.

First, application software is opened on the client 40 to play the music radio station online. Because information played by the music radio station is audio information, the application software of the client 40 acquires the audio information of the music radio station in a manner of directly reading the audio information by using an audio waveform or a system background.

After the audio information of the music radio station is acquired, initial determining is performed first, and when the audio information conforms to some features of music, audio feature information is extracted and may be encoded in a certain format and uploaded to a side of the server 20 by using a network, so as to acquire, from the server 20, a music file corresponding to the audio feature information, where the music file may be an audio-type song, and may also be an audio-video-type song, such as an MTV.

After receiving the audio feature information sent by the client 40, the server 20 analyzes and decodes the audio feature information, then compares and matches song track feature information in a local music database with the decoded audio feature information, and when a certain song is hit, returns corresponding media information to the client 40, where the media information includes information about the hit song (such as a song name, and a downloading address) and the current play time of the song.

After receiving the media information returned by the server 20, starting from a current playback progress of the radio station, the client 40 downloads a high-quality song file from the server 20, where the song file may be an audio-type song, and may also be an audio-video-type song.

When the song downloaded by the client 40 meets current synchronous play of the radio station, the song is automatically switched from being played by the radio station to being played by a local media player of the client 40. During the play, the volume of the radio station is automatically controlled, for example, the sound of the radio station is silenced or lowered, and the downloaded song is played according to a progress of the radio station.

The media player may be various types of media playback application software, such as a QQ music player, installed on the client 40.

In addition, when song downloading proceeds, the user may also download lyrics from the server 20 according to a requirement and synchronously display the lyrics.

In this embodiment, by using the foregoing solution, a mechanism for identifying music by listening to a song is used, and respective advantages of a music radio station and an online music player are combined, so that when listening to music of the radio station, a user identifies and matches corresponding music by using a player, and automatically downloads high-quality music to replace the music played by the radio station, which not only expands media channels of the user, but also implements lossless play of the music of the radio station by using the player, thereby providing better music playback services to the user.

Further, considering the program particularity of the music radio station, in a song downloading proceeding process, a host's voice or other non-music information may appear, and the client 40 may continue to compare the audio information of the radio station with song information currently played by the media player, and when a tiny difference appears, adjust the playback progress to keep consistent. When a large difference appears, for example, when a host's voice appears or a song is changed to another, the song is automatically switched from being played by the media player to being played by the radio station. The process skips again to the acquiring, by the client 40, audio information from the radio station, and extracting audio feature information from the audio information, to perform a next round of downloading and playing of the media file, and the cycle repeats itself.

Certainly, in a song downloading proceeding process, the user may also, according to a requirement or an actual situation, close the radio station or stop the function of using the player to replace the radio station to play a song.

In this embodiment, by using the foregoing solution, when playing a radio station online, a client 40 acquires audio information played by the radio station, and extracts audio feature information from the audio information; and sends the audio feature information to the server 20; the server 20 matches corresponding media information in a local database according to the audio feature information, and returns the matched media information to the client 40; and the client 40 downloads a corresponding media file from the server 20 according to the media information at a current playback progress, switches a current playback mode from the radio station to a media player, and plays the downloaded media file according to a playback progress of the radio station. Therefore, a mechanism for identifying music by listening to a song is used, respective advantages of a music radio station and an online media player are combined, audio resources of the music radio station are used, media channels of a user are expanded, and a terminal media player automatically downloads a corresponding media file to replace that played by the radio station, to improve the media playback effect. In addition, a current media playback progress may also be adjusted in real time, thereby providing better media playback services to the user.

Compared with the prior art, in this embodiment, information about a radio station song listened to by the user can be analyzed and downloaded, and a high-quality song is played to the user, to bring relatively desirable user experience; the audio resources of the music radio station are used to expand media channels of the user, an intelligent playback effect can differentiate and analyze a song and a human voice, and adjust the playback progress, and the operation is simple and convenient.

In addition, the media player of the client 40 may further generate a radio station song list according to downloaded song information played by the radio station, save the radio station song list into a radio station media list, and subsequently may select, according to a user requirement, a song in the radio station media list for replay, thereby avoiding waste of time for the user to search for a same song, and expanding channels of the user for listening to music.

Compared with the prior art, in this embodiment, information about a radio station song listened to by the user can be analyzed and downloaded, and a high-quality song is played to the user, to bring relatively desirable user experience, and the operation is simple and convenient; and advantages of the music radio station can be used to play high-quality music to the user, and a radio station program song list is automatically generated, which facilitates subsequent replay, thereby avoiding waste of time for the user to search for a same song, and expanding channels of the user for listening to music.

It should be further noted that, in this specification, the terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements existing in the process, the method, the article, or the device that includes the element.

The sequence numbers of the foregoing embodiments of the present disclosure are merely for the convenience of description, and do not imply the preference among the embodiments.

Through the descriptions of the preceding embodiments, persons skilled in the art may understand that the methods of the foregoing embodiments may be implemented by hardware only or by software and a necessary universal hardware platform. However, in most cases, using software and a necessary universal hardware platform are preferred. Based on such an understanding, the technical solutions of the present disclosure essentially, or the part contributing to the prior art may be implemented in a form of a software product. The computer software product is stored in a storage medium (such as a ROM/RAM, a magnetic disk, or an optical disc) and includes several instructions for instructing a terminal device (which may be a mobile phone, a computer, a server, a network device, or the like) to perform the methods described in the embodiments of the present disclosure.

The foregoing descriptions are merely preferred embodiments of the present disclosure but are not intended to limit the patent scope of the present disclosure. Any equivalent modifications made to the structures or processes based on the content of the specification and the accompanying drawings of the present disclosure for direct or indirect use in other relevant technical fields shall also be encompassed in the patent protection scope of the present disclosure.

What is claimed is:

1. A media playback method, the method comprising:

acquiring, by a client device, audio information from a radio station, and extracting audio feature information from the audio information;

sending the audio feature information to a server;

receiving media information that is matched according to the audio feature information and returned by the server;

downloading a corresponding media file from the server according to the media information at a current playback progress; and switching a playback mode of the client device from the radio station to a media player, and playing the media file according to a playback progress of the radio station;

comparing audio information currently played by the radio station with the media file played by the media player after switching to the media player and playing the downloaded media file, and determining whether a difference is generated between the audio information and the media file; and when a difference is generated between the audio information and the media file, and the difference is larger than a preset threshold, switching a current playback mode from the media player to the radio station, and returning to perform the step of acquiring, by a client device, audio information from a radio station, and extracting audio feature information from the audio information;

when a difference is generated between the audio information and the media file and the difference is not larger than a preset threshold, adjusting a playback progress of the media player to keep the playback progress consistent with the audio information on the radio station.

2. The method according to claim 1, after the extracting audio feature information from the audio information, further comprising:
encoding the audio feature information.

3. The method according to claim 1, wherein the playing the downloaded media file according to a playback progress of the radio station comprises:
playing a downloaded song according to the playback progress of the radio station, and synchronously displaying lyrics.

4. The method according to claim 1, further comprising:
when the difference satisfies a preset condition, adjusting a current playback progress of the media player to be consistent with that of the radio station.

5. The method according to claim 1, further comprising:
generating a radio station media list in the media player according to the audio information played by the radio station; and
replaying a media file in the radio station media list in the media player according to a user selection.

6. A media playback client device comprising:
one or more processors;
memory; and
a set of instructions stored in the memory and to be executed by the one or more processors, when executed by the one or more processors, the set of instructions cause the processor to:
acquire audio information from a radio station, and extract audio feature information from the audio information;
send the audio feature information to a server;
receive media information that is matched according to the audio feature information and returned by the server;
download a corresponding media file from the server according to the media information at a current playback progress;
switch a current playback mode from the radio station to a media player, and play the downloaded media file according to a playback progress of the radio station;
compare audio information currently played by the radio station with the media file played by the media player after switching to the media player and playing the downloaded media file, and determine whether a difference is generated between the audio information and the media file; and
when a difference is generated between the audio information and the media file, and the difference is larger than a preset threshold, switch a current playback mode from the media player to the radio station, and the acquiring module acquires audio information from the radio station, and extracts audio feature information from the audio information;

when a difference is generated between the audio information and the media file and the difference is not larger than a preset threshold, adjust a playback progress of the media player to keep the playback progress consistent with the audio information of the radio station.

7. The client device according to claim 6, wherein
the instructions that cause the processor to acquire the audio information further cause the processor to encode the audio feature information.

8. The client device according to claim 6, wherein
the instructions cause the processor to play the downloaded media file further cause the processor to play a downloaded song according to the playback progress of the radio station, and synchronously display lyrics.

9. The client device according to claim 6, wherein the instructions further cause the processor to:
the difference satisfies a preset condition, adjust a current playback progress of the media player to be consistent with that of the radio station.

10. The client device according to claim 6, wherein the instructions further cause the processor to:
generate a radio station media list in the media player according to the audio information played by the radio station, wherein
the instructions that cause the processor to play the downloaded media file further cause the processor to replay a media file in the radio station media list in the media player according to a user selection.

11. A non-transitory machine readable storage medium, comprising a set of instructions, the set of instructions to direct at least one processor to perform the acts of:
acquiring, by a client device, audio information from a radio station, and extracting audio feature information from the audio information;
sending the audio feature information to a server;
receiving media information that is matched according to the audio feature information and returned by the server;
downloading a corresponding media file from the server according to the media information at a current playback progress;
switching a playback mode of the client device from the radio station to a media player, and playing the media file according to a playback progress of the radio station;
comparing audio information currently played by the radio station with the media file played by the media player after switching to the media player and playing the downloaded media file, and determining whether a difference is generated between the audio information and the media file; and
when a difference is generated between the audio information and the media file, and the difference is larger than a preset threshold, switching a current playback mode from the media player to the radio station, and returning to perform the step of acquiring, by a client device, audio information from a radio station, and extracting audio feature information from the audio information;

when a difference is generated between the audio information and the media file and the difference is not larger than a preset threshold, adjusting a playback progress of the media player to keep the playback progress consistent with the audio information of the radio station.

12. The non-transitory machine readable storage medium according to claim 11, after the extracting audio feature information from the audio information, further comprising:
encoding the audio feature information.

13. The non-transitory machine readable storage medium according to claim 11, wherein the playing the downloaded media file according to a playback progress of the radio station comprises:
playing a downloaded song according to the playback progress of the radio station, and synchronously displaying lyrics.

14. The non-transitory machine readable storage medium according to claim 11, wherein the set of instructions further direct the at least one processor to perform the acts of:
when the difference satisfies a preset condition, adjusting a current playback progress of the media player to be consistent with that of the radio station.

15. The non-transitory machine readable storage medium according to claim 11, wherein the set of instructions further direct the at least one processor to perform the acts of:
generating a radio station media list in the media player according to the audio information played by the radio station; and
replaying a media file in the radio station media list in the media player according to a user selection.

* * * * *